United States Patent
Daikuhara

(10) Patent No.: US 7,581,892 B2
(45) Date of Patent: Sep. 1, 2009

(54) OPTICAL CONNECTOR MODULE AND ELECTRIC CONNECTOR MODULE

(75) Inventor: Osamu Daikuhara, Shinagawa (JP)

(73) Assignee: Fujitsu Component Limited, Tokyo (JP)

( * ) Notice: Subject to any disclaimer, the term of this patent is extended or adjusted under 35 U.S.C. 154(b) by 0 days.

(21) Appl. No.: 11/730,692

(22) Filed: Apr. 3, 2007

(65) Prior Publication Data

US 2008/0013895 A1   Jan. 17, 2008

(30) Foreign Application Priority Data

Jul. 13, 2006   (JP)   ............................. 2006-193220

(51) Int. Cl.
G02B 6/36  (2006.01)
(52) U.S. Cl. ............................... 385/92; 385/88; 385/89
(58) Field of Classification Search .................... 385/88, 385/89, 92–94
See application file for complete search history.

(56) References Cited

U.S. PATENT DOCUMENTS

| | | | |
|---|---|---|---|
| 5,013,247 A * | 5/1991 | Watson | 439/55 |
| 6,305,848 B1 * | 10/2001 | Gregory | 385/53 |
| 6,712,527 B1 * | 3/2004 | Chan et al. | 385/88 |
| 6,758,693 B2 * | 7/2004 | Inagaki et al. | 439/577 |
| 6,769,814 B2 * | 8/2004 | Kiani et al. | 385/78 |
| 6,793,539 B1 * | 9/2004 | Lee et al. | 439/701 |
| 6,802,654 B1 * | 10/2004 | Roberts et al. | 385/88 |
| 6,891,735 B2 * | 5/2005 | Hultermans et al. | 361/800 |
| 7,134,796 B2 * | 11/2006 | Anderson | 385/88 |
| 2002/0136501 A1 * | 9/2002 | Yen et al. | 385/88 |
| 2005/0215119 A1 * | 9/2005 | Kaneko | 439/607 |
| 2006/0029336 A1 * | 2/2006 | Gunther et al. | 385/92 |
| 2006/0063511 A1 * | 3/2006 | Shima et al. | 455/410 |

FOREIGN PATENT DOCUMENTS

JP         09-006479         1/1997

* cited by examiner

Primary Examiner—Uyen Chau N Le
Assistant Examiner—Rhonda S Peace
(74) Attorney, Agent, or Firm—Staas & Halsey LLP

(57) ABSTRACT

A disclosed optical connector module includes an optical connector configured to receive an optical plug provided at an end of an optical fiber cable and a photoelectric conversion unit configured to convert an optical signal into an electric signal and vice versa. The disclosed optical connector module is mountable on a main board and has substantially the same outside dimensions as those of an electric connector module mountable on the main board which electric connector module includes an electric connector configured to receive an electric plug provided at an end of an electric cable.

7 Claims, 14 Drawing Sheets

OPTICAL CONNECTOR MODULE AND ELECTRIC CONNECTOR MODULE

BACKGROUND OF THE INVENTION

1. Field of the Invention

The present invention generally relates to an optical connector module and an electric connector module, and more particularly relates to an optical connector module and an electric connector module that are mountable on a main board of a server or a router.

2. Description of the Related Art

FIG. 1A is a drawing illustrating a conventional server 10.

Electric cables 11-1 through 11-3 are connected to one side of the server 10 and computers 30-1 through 30-n are connected to another side of the server 10.

The server 10 includes a main board 20 having electric connectors 21-1 through 21-3 on one side. The electric cables 11-1 through 11-3 have electric plugs 12-1 through 12-3 at their ends and are connected to the server 10 by inserting the electric plugs 12-1 through 12-3 into the electric connectors 21-1 through 21-3, respectively.

[Patent document 1] Japanese Patent Application Publication No. 9-6479

Take, for example, a case where the electric cable 11-1 is replaced with an optical fiber cable 50 as shown in FIG. 1C to increase the data transmission distance and the amount of data transmittable. In this case, according to a conventional technology, it is necessary to replace the main board 20 in the server 10 with a main board 20A shown in FIG. 1B having a different configuration.

On the main board 20A, a photoelectric conversion element 40, a driver IC 41, a receiver IC 42, and an optical connector 45, in place of the electric connector 21-1 of the main board 20, are mounted.

FIG. 1C is a drawing illustrating a server 10A. The server 10A includes the main board 20A. An optical plug 51 at an end of the optical fiber cable 50 is fitted into the optical connector 45.

Thus, according to a conventional technology, it is necessary to replace the main board in order to upgrade a server and, therefore, upgrading a server is an economic burden on the user.

SUMMARY OF THE INVENTION

The present invention provides an optical connector module and an electric connector module that substantially obviate one or more problems caused by the limitations and disadvantages of the related art.

According to an embodiment of the present invention, an optical connector module includes an optical connector configured to receive an optical plug provided at an end of an optical fiber cable; and a photoelectric conversion unit configured to convert an optical signal into an electric signal and vice versa; wherein the optical connector module is mountable on a main board and has substantially the same outside dimensions as those of an electric connector module mountable on the main board and including an electric connector configured to receive an electric plug provided at an end of an electric cable.

According to another embodiment of the present invention, an optical connector module includes a module main unit including a printed circuit board, an optical connector configured to receive an optical plug provided at an end of an optical fiber cable, a light-emitting element, a light-receiving element, a driver IC configured to drive the light-emitting element, a receiver IC configured to amplify a signal from the light-receiving element, and a module-side electric connector to be connected to a board-side electric connector on a main board, wherein the optical connector, the light-emitting element, the light-receiving element, the driver IC, the receiver IC, and the module-side electric connector are mounted on the printed circuit board, and the optical connector and the light-emitting element and the optical connector and the light-receiving element are optically connected, respectively; and a holder configured to hold the module main unit and to be fastened to the main board; wherein the optical connector module has substantially the same outside dimensions as those of an electric connector module mountable on the main board which electric connector module includes an electric connector configured to receive an electric plug provided at an end of an electric cable and a module-side electric connector to be connected to the board-side electric connector on the main board.

According to another embodiment of the present invention, an optical connector module includes a module main unit including a printed circuit board, an optical connector configured to receive an optical plug provided at an end of an optical fiber cable, a light-emitting element, a light-receiving element, a driver IC configured to drive the light-emitting element, a receiver IC configured to amplify a signal from the light-receiving element, and a module-side electric connector to be connected to a board-side electric connector on a main board, wherein the optical connector, the light-emitting element, the light-receiving element, the driver IC, and the receiver IC are mounted on a front side of the printed circuit board, and the module-side electric connector is mounted on a back side of the printed circuit board, the optical connector and the light-emitting element and the optical connector and the light-receiving element are optically connected, respectively; and a holder configured to hold the module main unit and to be fastened to the main board.

According to still another embodiment of the present invention, an electric connector module includes a module main unit including a printed circuit board, an electric connector mounted on a front side of the printed circuit board and configured to receive an electric plug provided at an end of an electric cable, a module-side electric connector mounted on a back side of the printed circuit board and configured to be connected to a board-side electric connector on a main board, and a PHY-IC mounted on the back side of the printed circuit board and configured to restore a waveform of an electric signal; and a holder configured to hold the module main unit and to be fastened to the main board.

DETAILED DESCRIPTION OF THE PREFERRED EMBODIMENTS

Preferred embodiments of the present invention are described below with reference to the accompanying drawings.

First Embodiment

[Configuration of Optical Connector Module 100]

Figure 1A:
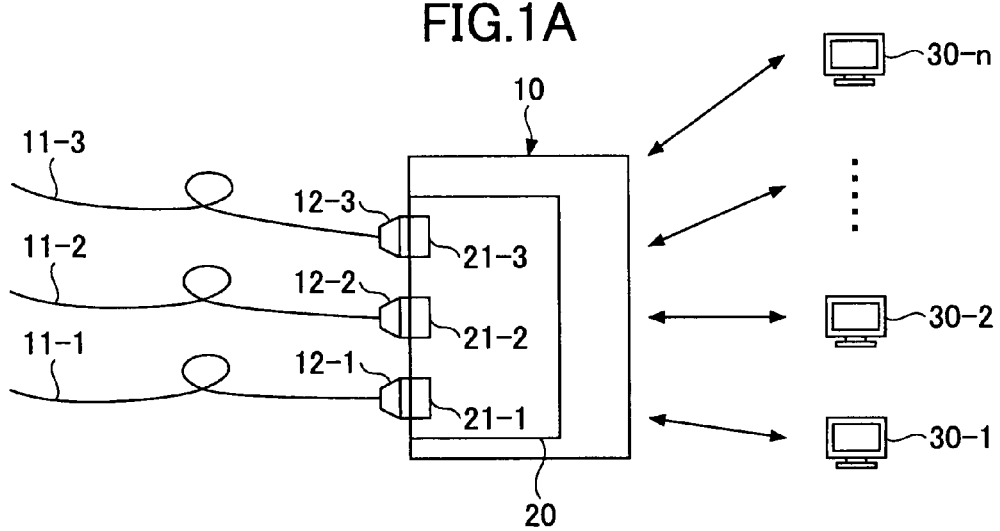
FIGS. 1A through 1C are drawings illustrating a conventional server.
Figure 1B:
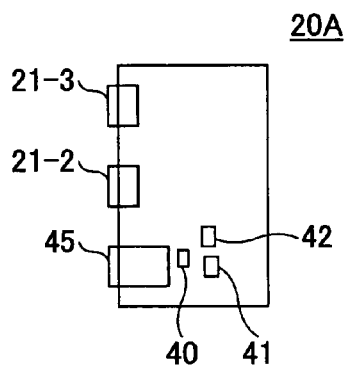
Figure 1C:
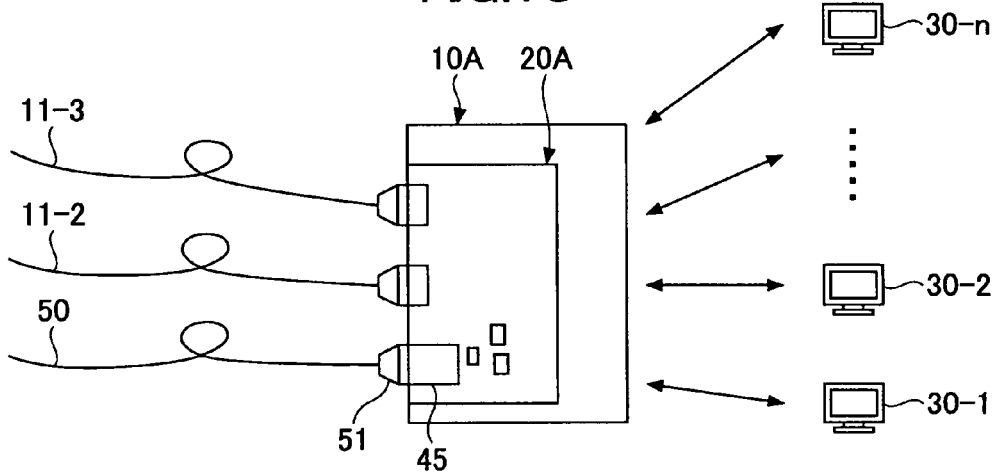
Figure 2:
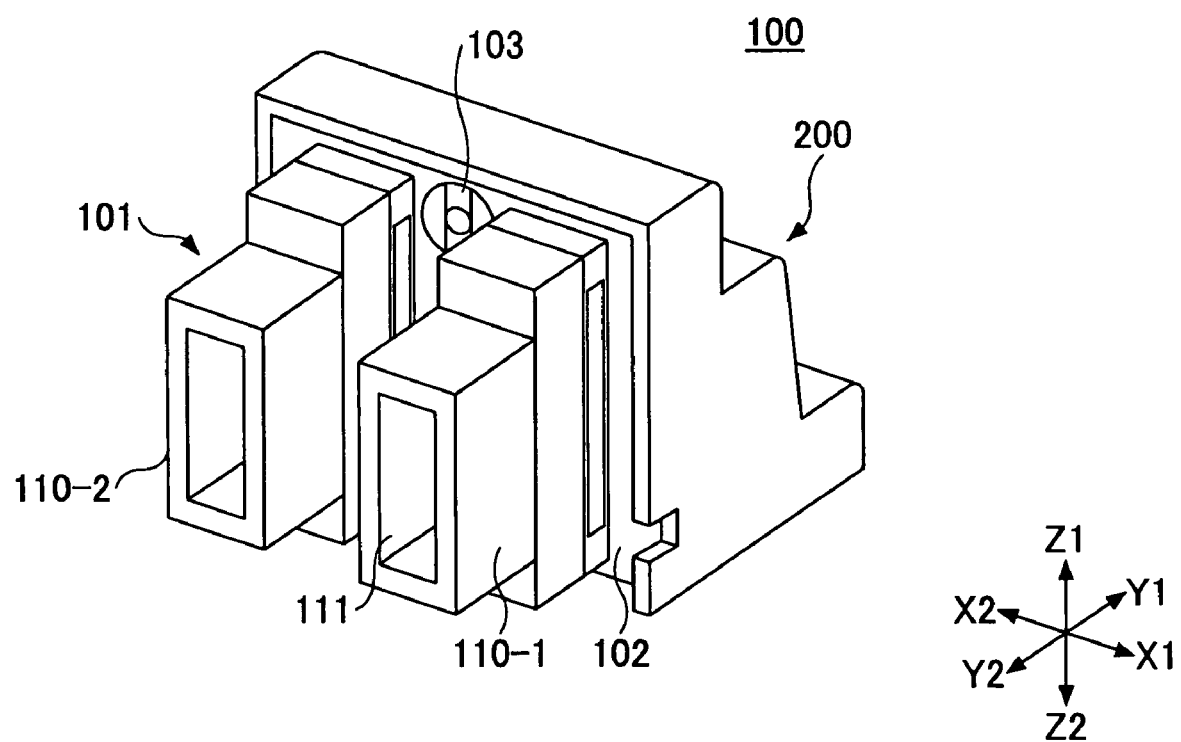
FIG. 2 is a perspective view of an exemplary optical connector module according to a first embodiment of the present invention.
Figure 3:
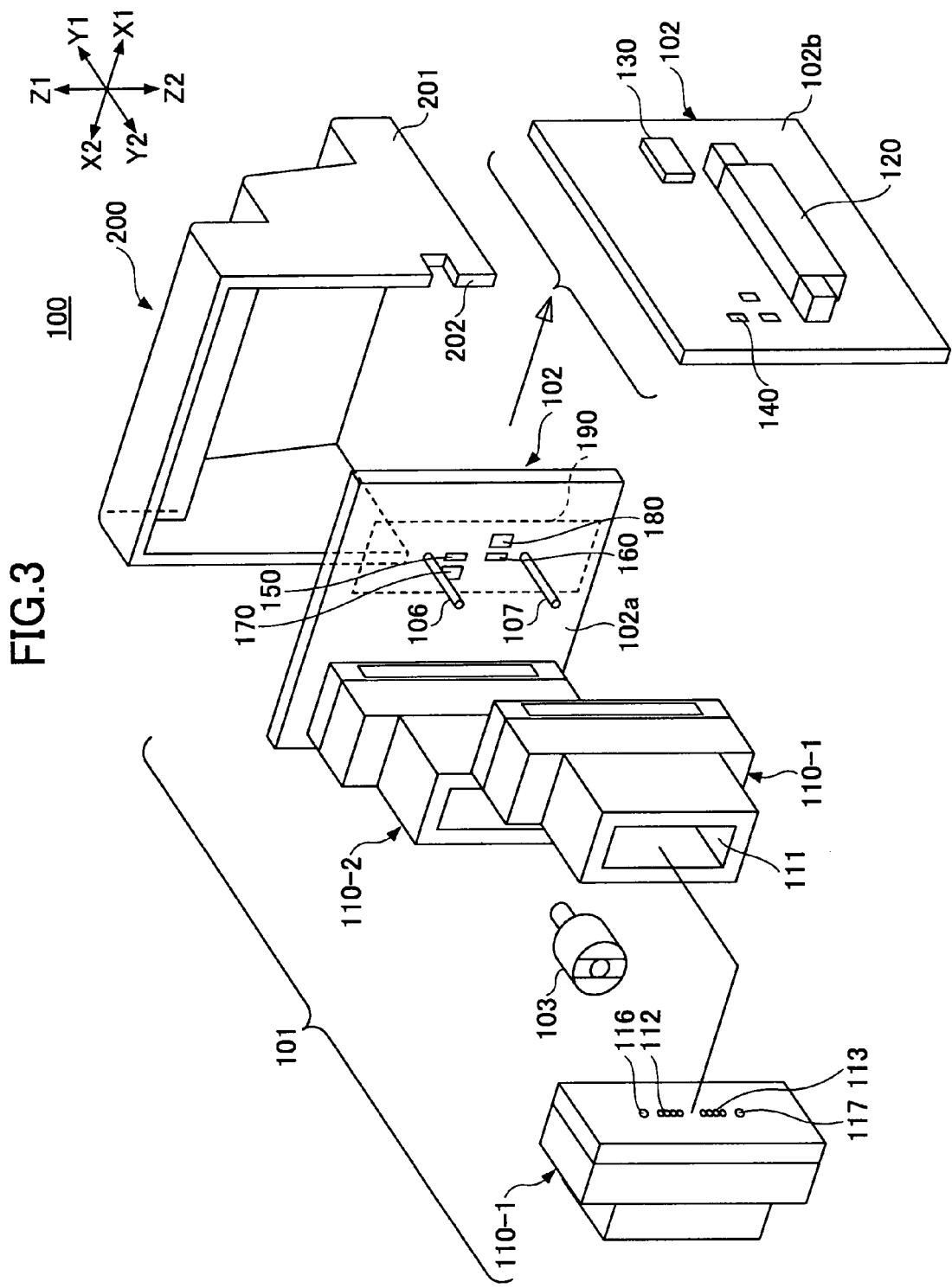
FIG. 3 is an exploded perspective view of the exemplary optical connector module shown in FIG. 2.
Figure 4A:
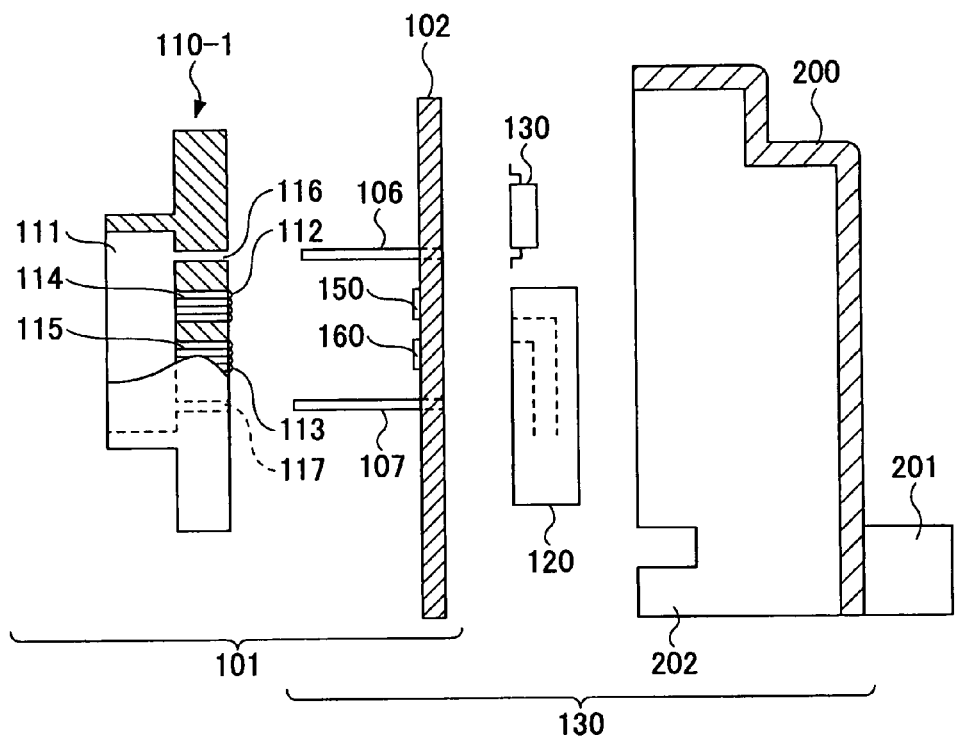
FIG. 4A is an exploded side view of the exemplary optical connector module shown in FIG. 2.
Figure 4B:
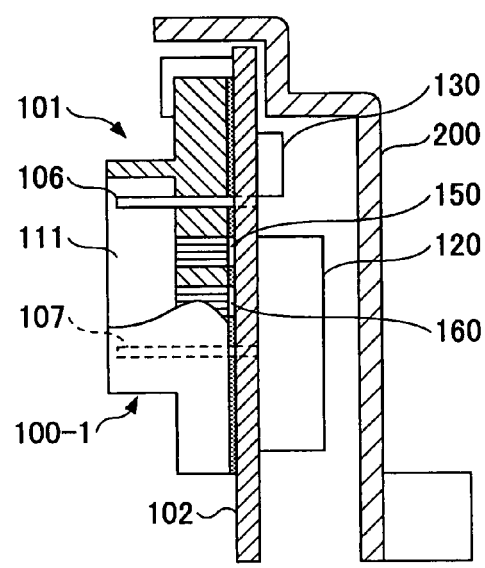
FIG. 4B is a cut-away side view of the exemplary optical connector module shown in FIG. 2.

FIG. 2 is a perspective view of an optical connector module 100 according to a first embodiment of the present invention. FIG. 3 is an exploded perspective view of the optical connector module 100. FIG. 4A is an exploded side view of the optical connector module 100. FIG. 4B is a cut-away side view of the optical connector module 100.

The optical connector module 100 is used for parallel transmission and includes a module main unit 101 and a holder 200. The optical connector module 100 has substantially the same outside dimensions as those of an electric connector module 220-1 shown in FIG. 8A and can be mounted on a main board 210 (see FIGS. 7 through 8B) in place of the electric connector module 220-1 in a position where the electric connector module 220-1 has been mounted. In FIGS. 2 and 3, arrows X1-X2 show the width directions, Y1-Y2 show the depth directions, and Z1-Z2 show the height directions of the optical connector module 100. The optical connector module 100 is mounted vertically on the main board 210 of a server 500A (see FIG. 8B) and connected to an electric connector 211 (see FIG. 7) on the main board 210. Thus, the optical connector module 100 connects an optical fiber cable 260 (see FIG. 9) and the main board 210.

The module main unit 101 includes a printed circuit board 102, optical connectors 110-1 and 110-2 arranged parallel to each other on a front side 102a of the printed circuit board 102, a module-side electric connector 120 mounted on a back side 102b of the printed circuit board 102 and having 16 channels, and a surface emitting diode (VCSEL: vertical cavity surface emitting laser) 150 provided for each of the optical connectors 110-1 and 110-2.

The holder 200 is shaped like a box and made by molding, for example, a synthetic resin. The holder 200 is plated with a conductive material and has leg parts 201 and 202 at the Z2 side for screwing to the main board 210.

The printed circuit board 102 of the module main unit 101 is placed in the holder 200 and fastened to the holder 200 by a threaded fastener 103. Thus, the module-side electric connector 120, a control IC 130, and a power supply circuit chip 140 are covered by the holder 200. The optical connectors 110-1 and 110-2 are exposed on the front side of the optical connector module 100.

As described later, the optical connector module 100 is configured to be mounted on the main board 210.

[Configuration of Module Main Unit 101]

The optical connector 110-1 conforms to, for example, JISC5982 and is an MPO-type (or MTP-type) optical connector to which an optical plug 261 (see FIG. 9) is connected. The optical connector 110-1 has an optical plug socket 111 on its front side (see FIG. 2), optical waveguides 114 and 115 formed through the bottom of the optical plug socket 111 (see FIG. 4A), and lens parts 112 and 113 at the ends of the optical waveguides 114 and 115 (see FIG. 3 and FIG. 4A). Each of the lens parts 112 and 113 is made up of four lenses each having a spherical surface. In other words, the lens parts 112 and 113 have eight channels. Through holes 116 and 117 are formed in the optical connector 110-1. The through holes 116 and 117 are formed in positions corresponding to reference pins 106 and 107 and lead to the optical plug socket 111. The optical waveguides 114 and 115 and the lens parts 112 and 113 are positioned with reference to the through holes 116 and 117.

Figure 5:
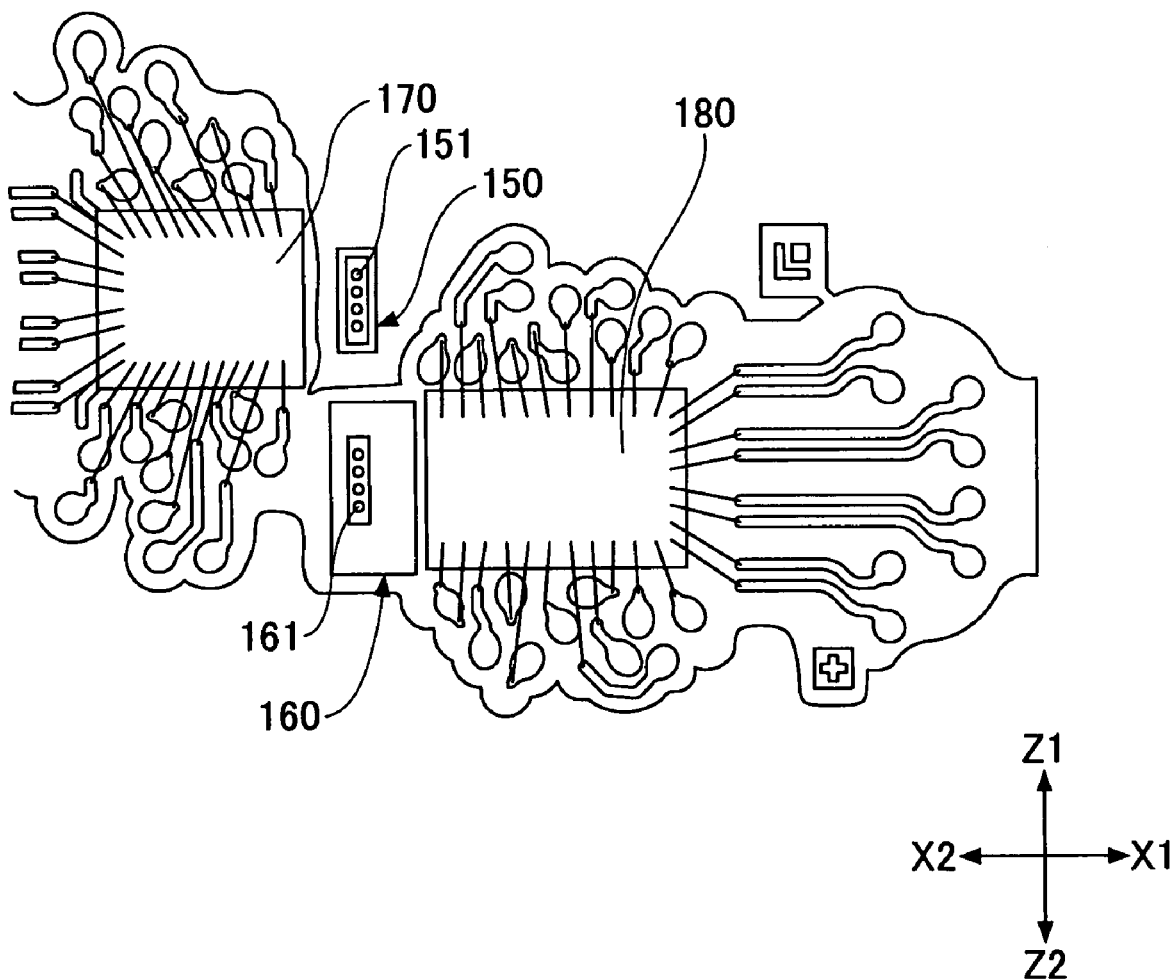
FIG. 5 is an enlarged view of electronic components on the front side of a printed circuit board.
Figure 6:
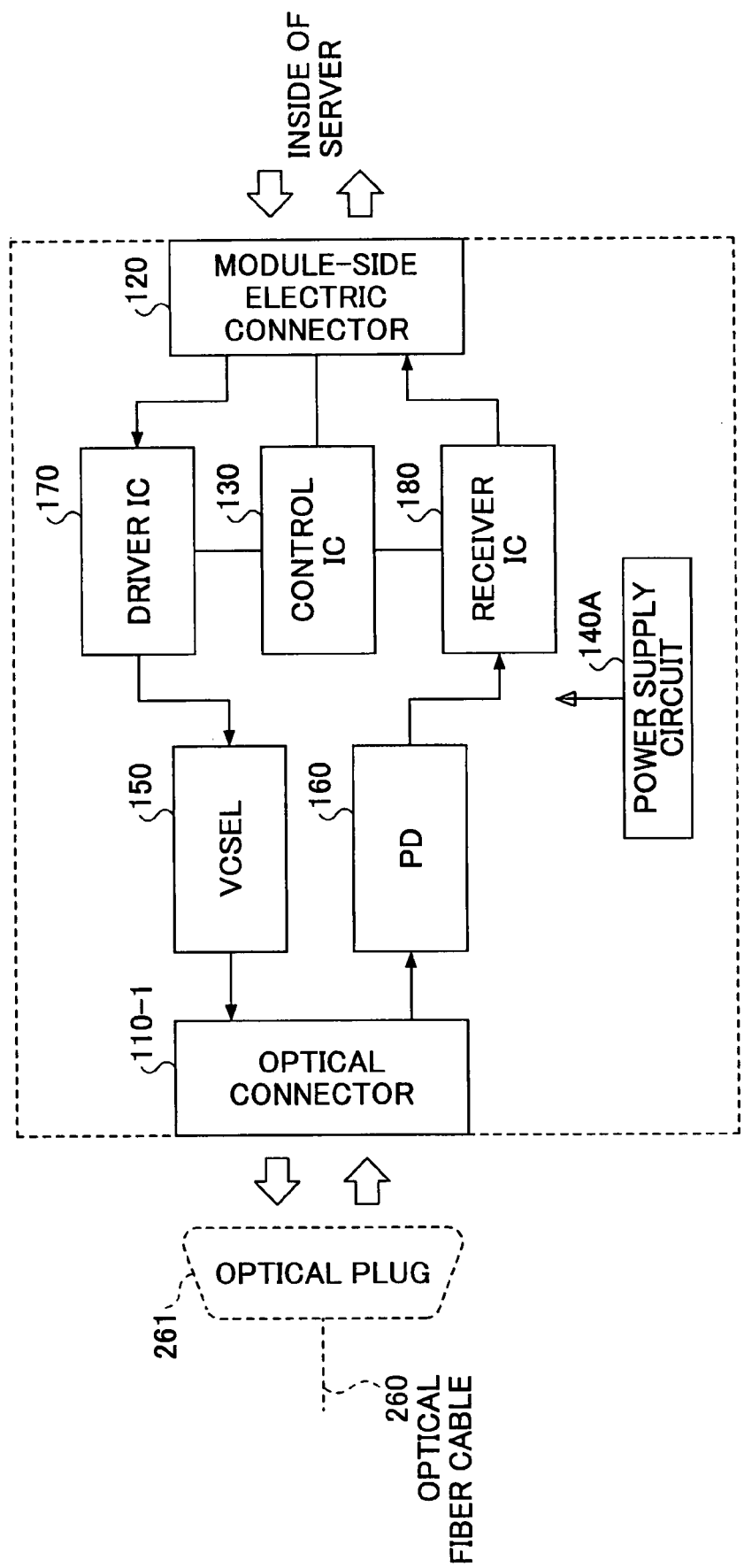
FIG. 6 is a block diagram illustrating a module main unit of the exemplary optical connector module.

FIG. 5 is an enlarged view of electronic components in an area 190 on the front side 102a of the printed circuit board 102 on which area 190 the optical connector 110-1 is to be mounted. FIG. 6 is a block diagram illustrating the module main unit 101.

In the center area of the area 190, the surface emitting diode 150 having four channels, a photodetector 160 having four channels, a driver IC 170 having four channels, and a receiver IC 180 having four channels are mounted. The reference pins 106 and 107 are planted on the printed circuit board 102 and protrude from the front side 102a. The surface emitting diode 150, the photodetector 160, the driver IC 170, and the receiver IC 180 form a photoelectric conversion unit for converting an optical signal into an electric signal and vice versa.

The surface emitting diode 150 and the photodetector 160 are arranged along the Z direction and positioned with reference to the reference pins 106 and 107. Also, the positions of the surface emitting diode 150 and the photodetector 160 correspond to the positions of the lens parts 112 and 113 of the optical connector 110-1. The surface emitting diode 150 includes four light-emitting parts 151 arranged along the Z direction. The photodetector 160 includes four light-receiving parts 161 arranged along the Z direction.

The driver IC 170 is a bare chip and mounted next to the surface emitting diode 150. The driver IC 170 is wire-bonded to a pattern on the printed circuit board 102 and is thereby connected to the surface emitting diode 150. The driver IC 170 drives the surface emitting diode 150 according to an electric signal supplied from the module-side electric connector 120.

The receiver IC 180 is a bare chip and mounted next to the photodetector 160. The receiver IC 180 is wire-bonded to a pattern on the printed circuit board 102 and is thereby connected to the photodetector 160. The receiver IC 180 amplifies an electric signal from each of the light-receiving parts 161 of the photodetector 160 and outputs the amplified electric signal to the module-side electric connector 120.

As shown in FIGS. 4A and 4B, the reference pins 106 and 107 are fitted into the through holes 116 and 117 and determine the position of the optical connector 110-1. The optical connector 110-1 is thus mounted on the front side 102a of the printed circuit board 102 so that the lens parts 112 and 113 face the surface emitting diode 150 and the photodetector 160, respectively. The optical connector 110-1 and the surface emitting diode 150 and the optical connector 110-1 and the photodetector 160 are optically connected, respectively. One end of each of the reference pins 106 and 107 protrudes into the optical plug socket 111.

The control IC 130 controls the driver IC 170 and the receiver IC 180 and thereby controls the communication status and the laser power to maintain stable communications. As shown in FIG. 3, the control IC 130 is mounted on the back side 102b of the printed circuit board 102.

The power supply circuit chip 140 constitutes a power supply circuit 140A shown in FIG. 6 and is mounted on the back side 102b of the printed circuit board 102. The power supply circuit 140A is supplied with electric power via the module-side electric connector 120 from the server 500A and supplies a driving voltage to each of the control IC 130, the driver IC 170, and the receiver IC 180.

The optical connector 110-2 has substantially the same configuration as those of the optical connector 110-1.

[Usage of optical connector module 100]

How to use the optical connector module 100 is described below.

Figure 7:
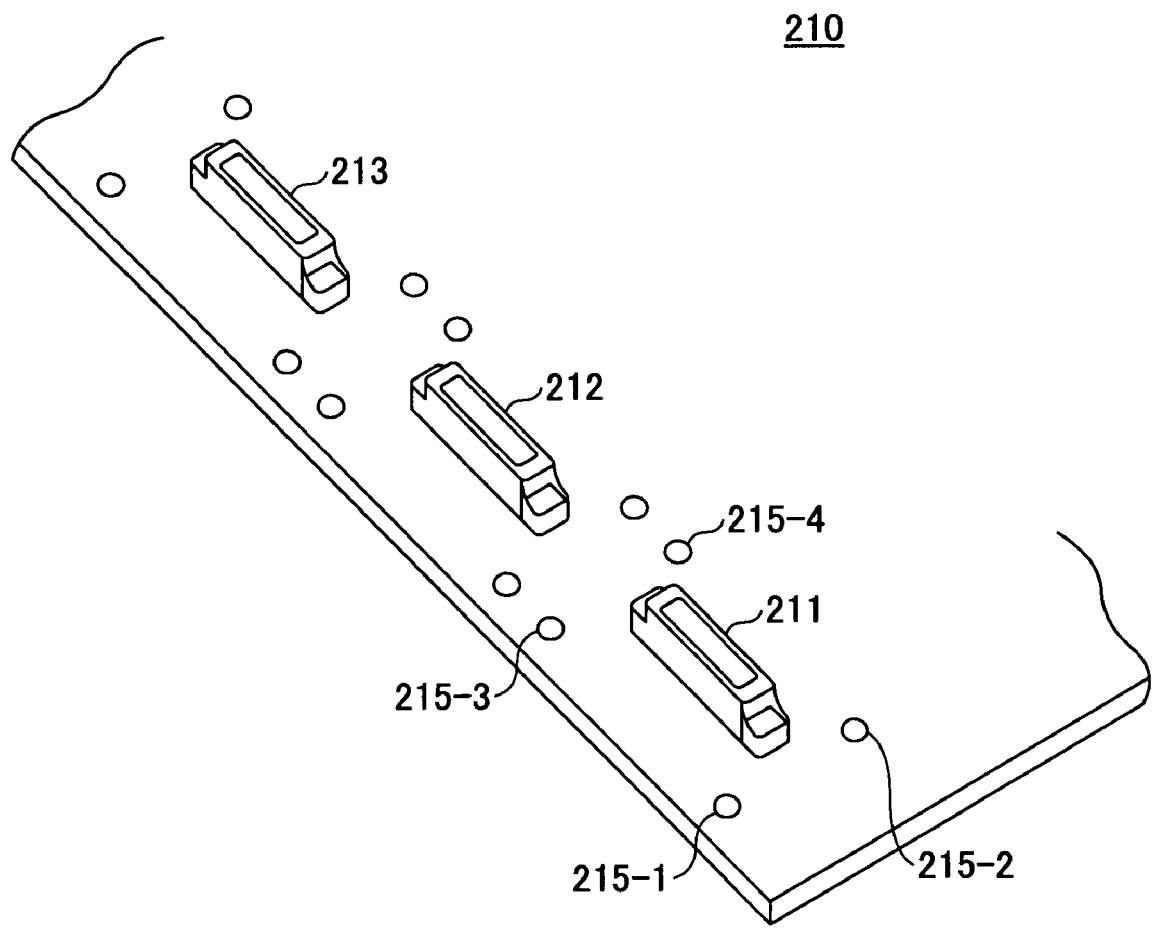
FIG. 7 is a drawing illustrating a part of a main board.
Figure 8A:
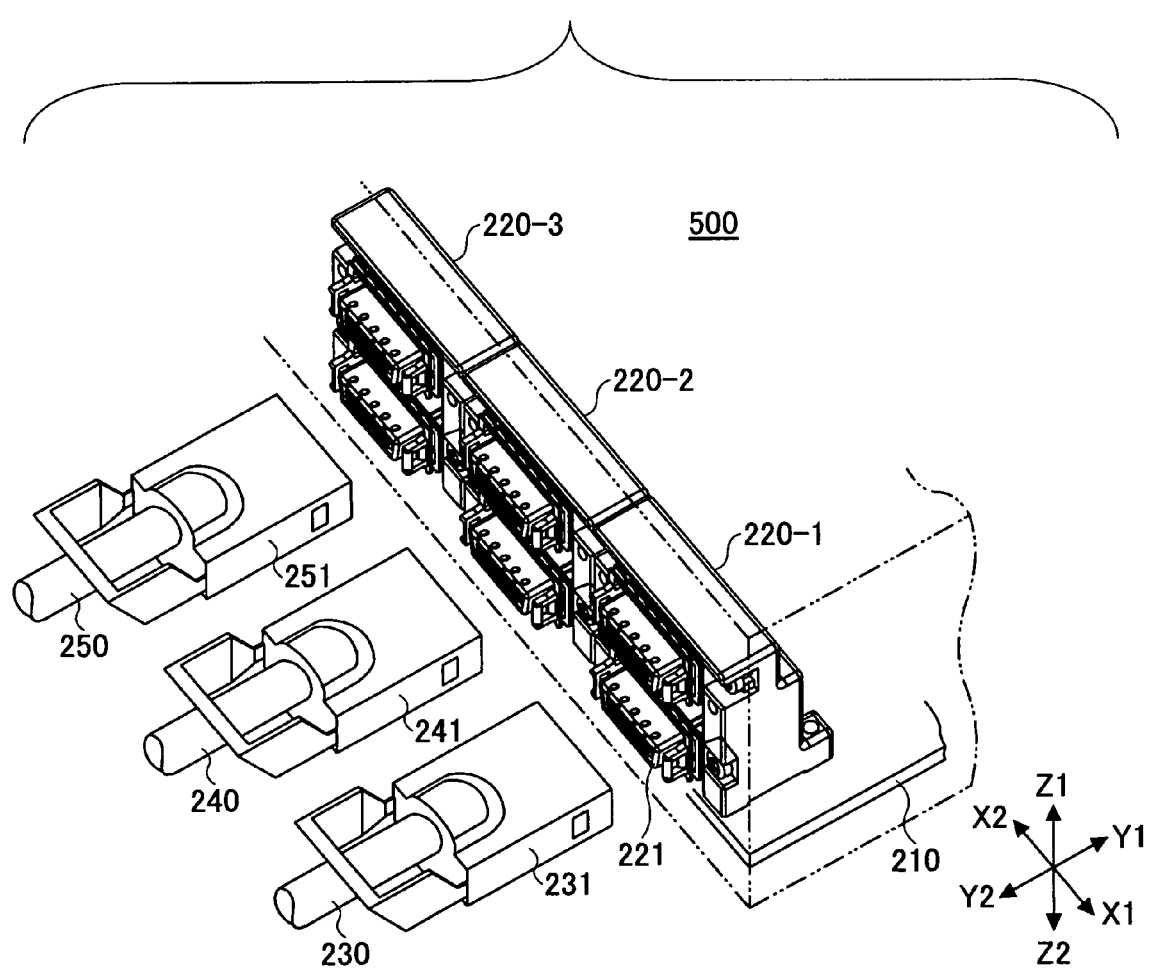
FIGS. 8A and 8B are drawings illustrating an exemplary server that uses the exemplary optical connector module shown in FIG. 2.

FIG. 7 is a drawing illustrating a part of the main board 210 of a server 500 (see FIG. 8A). Board-side electric connectors 211 through 213 for connecting electric connector modules or optical connector modules are mounted lengthwise next to each other near the Y2 edge of the main board 210. Four through holes 215-1 through 215-4 are formed in the main board 210 around each of the board-side electric connectors 211 through 213.

FIG. 8A is a drawing illustrating the server 500 without the optical connector module 100. The server 500 includes the main board 210 on which electric connector modules 220-1 through 220-3 are mounted. Each of the electric connector modules 220-1 through 220-3 has electric connectors 221. On the main board 210, other electric circuits (not shown) are also formed.

An electric connector 231 at an end of an electric cable 230 is connected to the electric connector module 220-1, an electric connector 241 at an end of an electric cable 240 is connected to the electric connector module 220-2, and an electric connector 251 at an end of an electric cable 250 is connected to the electric connector module 220-3.

The server 500 is being used with the above configuration.

Take, for example, a case where the electric cable 230, out of the electric cables 230, 240, and 250, is replaced with an optical fiber cable 260 to enhance the performance of the server 500.

Figure 8B:
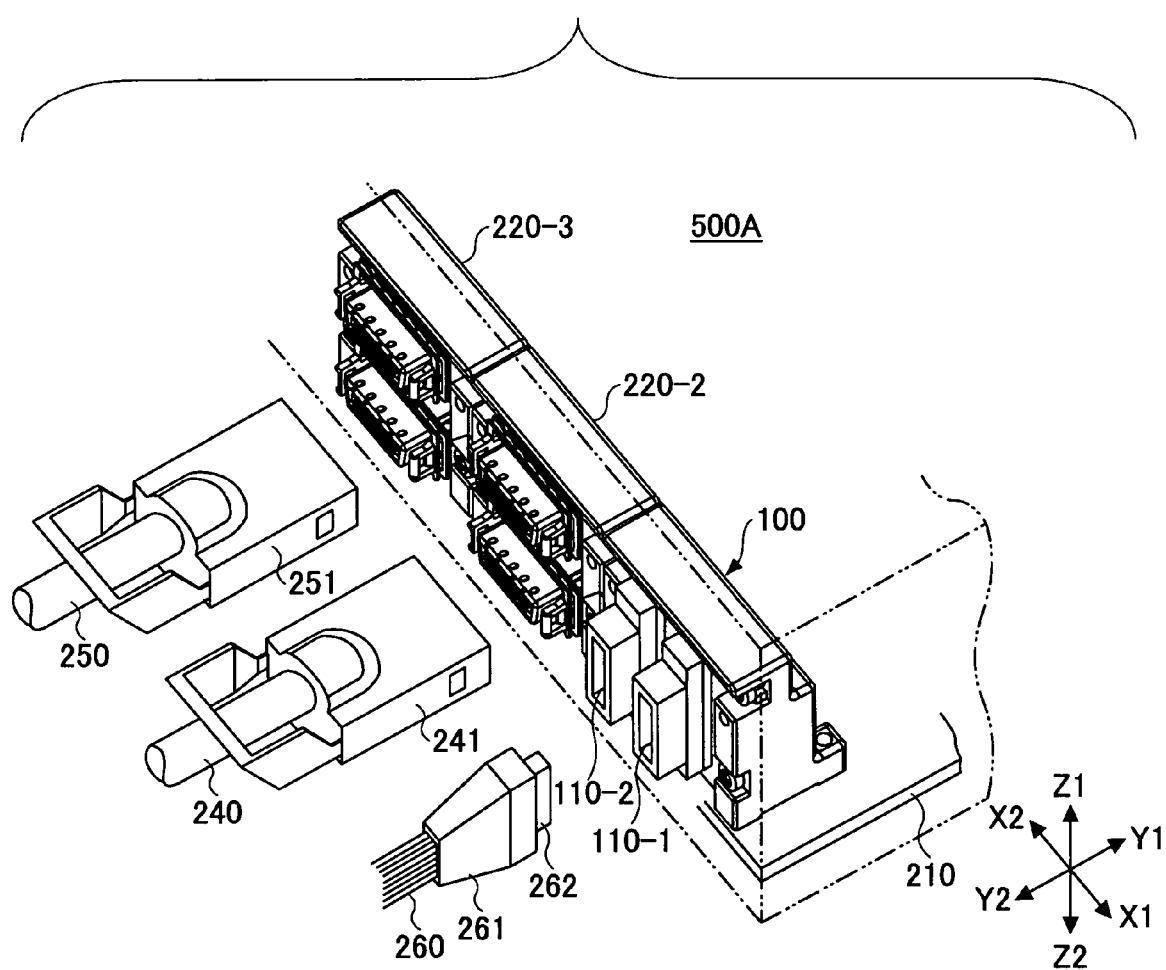

FIG. 8B is a drawing illustrating the server 500A where the electric connector module 220-1 is replaced with the optical connector module 100.

The main board 210 can be used without change. In other words, there is no need to replace the main board 210 to upgrade the server 500 to the server 500A.

To upgrade the server 500, the electric connector module 220-1 shown in FIG. 8A is unscrewed and removed from the main board 210 and then the optical connector module 100 is mounted on the main board 210.

Figure 9:
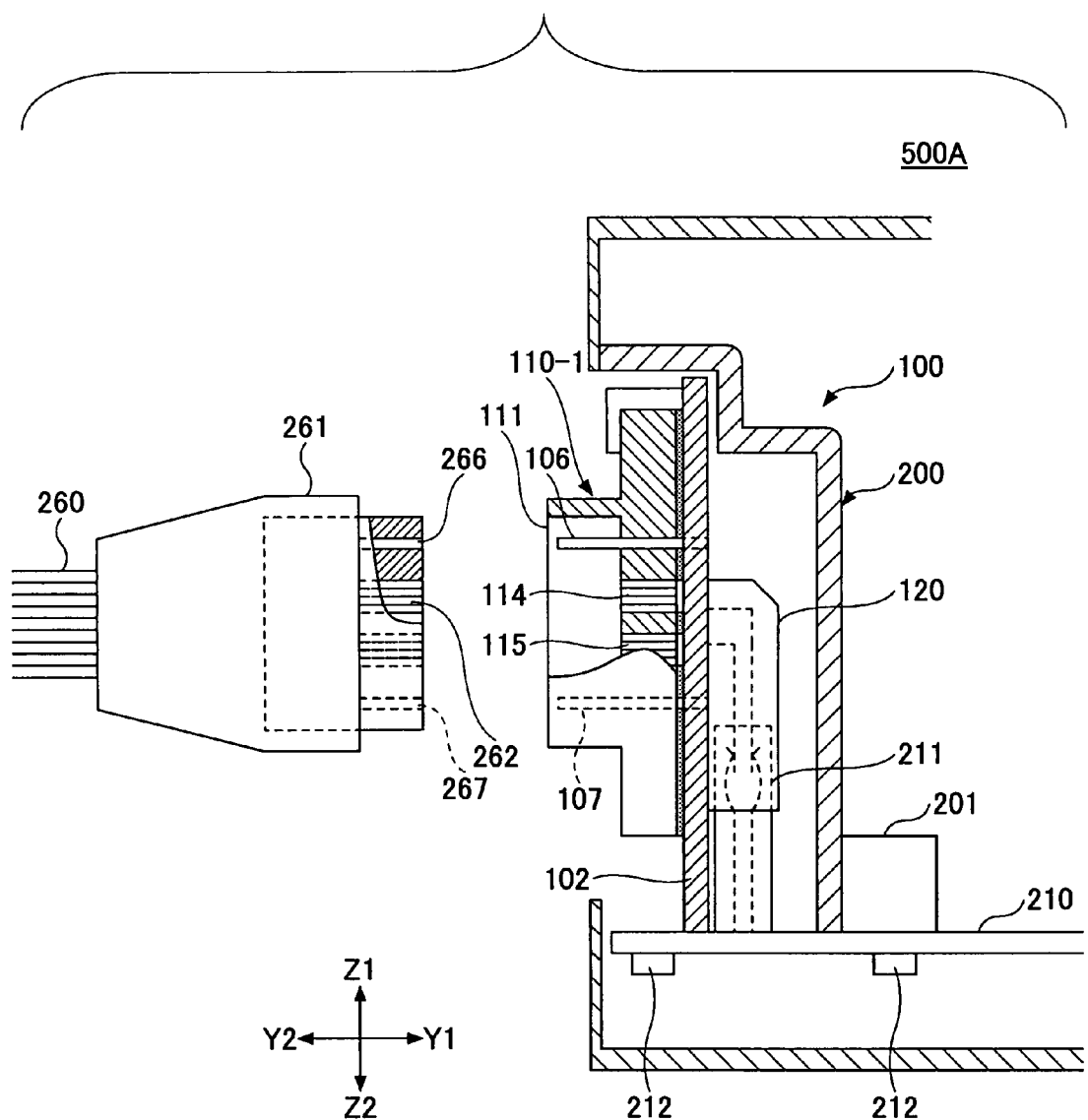
FIG. 9 is a cut-away side view of the exemplary server, the exemplary optical connector module, and an optical plug.

As shown in FIG. 9, the optical connector module 100 is placed on the main board 210 with the module-side electric connector 120 and the board-side electric connector 211 fitted together. Then, the optical connector module 100 is fixed to the main board 210 with four screws 212 inserted from the under side of the main board 210 through the through holes 215-1 through 215-4 into the leg parts 201 and 202 of the holder 200. The printed circuit board 102 is positioned perpendicular to the main board 210 and the optical connectors 110-1 and 110-2 are positioned to face the Y2 direction.

The optical fiber cable 260 shown in FIGS. 8B and 9 is made up of eight optical fibers and has an MPO-type optical plug 261 at its end. The optical plug 261 is fitted into the optical plug socket 111 and is thereby connected to the optical connector 110-1. A ferrule 262 protrudes from the optical plug 261. End faces of the optical fibers of the optical fiber cable 260 are exposed in a row on the edge surface of the ferrule 262. Also, positioning holes 266 and 267 are formed near the ends of the edge surface of the ferrule 262.

Thus, the optical plug 261 of the optical fiber cable 260 extending from the outside is fitted into the optical plug socket 111 and is thereby connected to the optical connector 110-1. The position of the optical plug 261 in the optical plug socket 111 is determined by the reference pins 106 and 107 fitted into the positioning holes 266 and 267. When the optical plug 261 is connected to the optical connector 110-1, the edge surface of the ferrule 262 faces the ends of the optical waveguides 114 and 115 on the bottom of the optical plug socket 111.

Thus, the server 500 is upgraded to the server 500A. The operation of the optical connector module 100 is described below.

An optical signal transmitted through the optical fiber cable 260 is converted into an electric signal by the optical connector module 100 and sent to the main board 210.

On the other hand, an electric signal from the main board 210 is converted into an optical signal by the optical connector module 100 and output to the optical fiber cable 260.

The above operation is described below in more detail with reference to FIG. 6. The power supply circuit 140A is supplied with electric power from the server 500A via the board-side and module-side electric connectors 211 and 120 and supplies a driving voltage to each of the control IC 130, the driver IC 170, and the receiver IC 180.

An optical signal transmitted through four of the eight optical fibers of the fiber cable 230 passes through the optical plug 261 and the optical connector 110-1, is output from the lens part 113 to the light-receiving parts 161 of the photodetector 160, and is converted by the photodetector 160 into an electric signal. The electric signal is then amplified by the receiver IC 180 and sent to the main board 210 via the module-side and board-side electric connectors 120 and 211.

An electric signal from the main board 210 is sent via the board-side and module-side electric connectors 211 and 120 to the driver IC 170. The driver IC 170 causes the surface emitting diode 150 to emit light from the light-emitting parts 151 according to the electric signal. Thus, the electric signal is converted into an optical signal. The optical signal enters the optical connector 110-1 via the lens part 112, passes through the optical plug 261, and is sent out to the other four of the eight optical fibers of the optical fiber cable 260.

Second Embodiment

Figure 10:
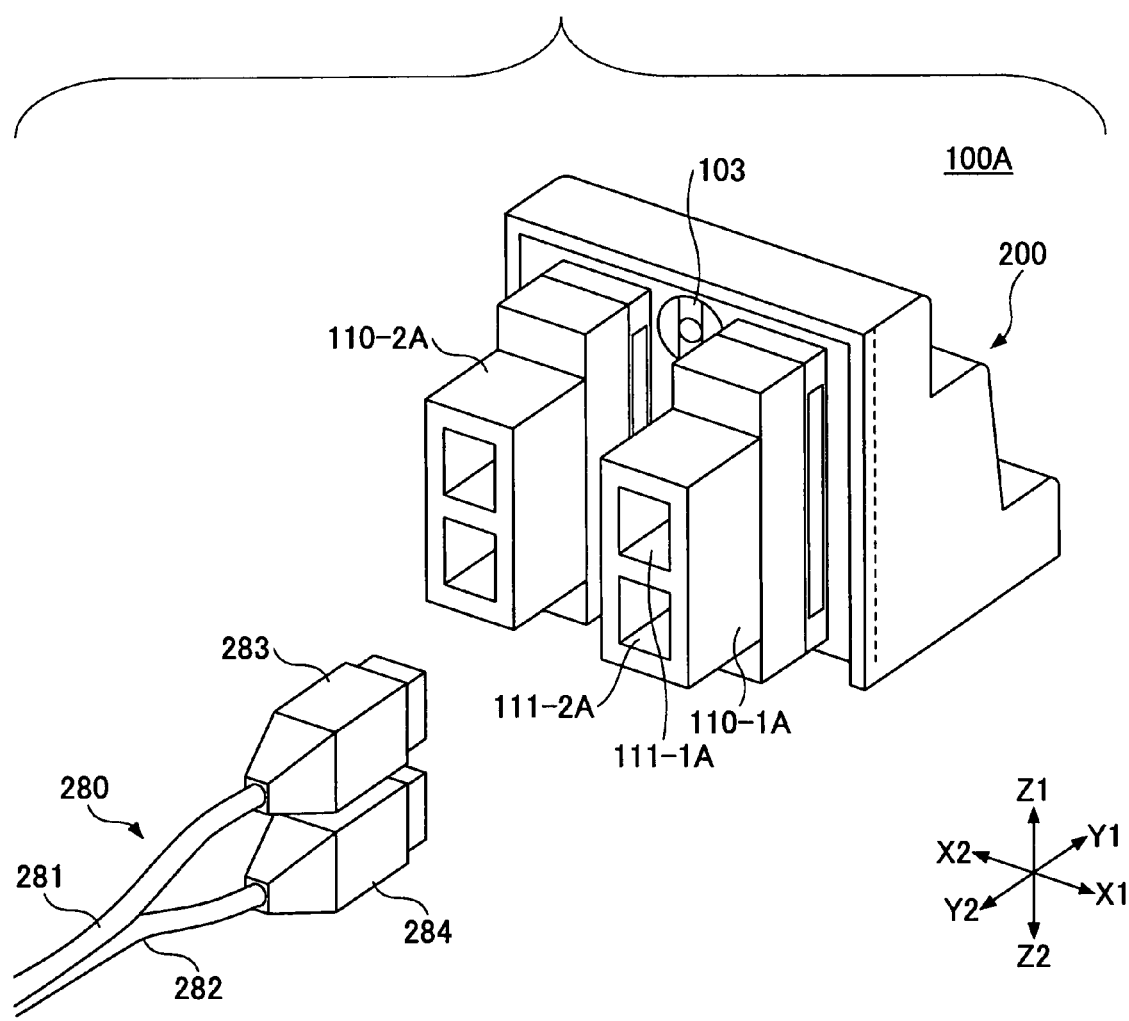
FIG. 10 is a perspective view of an exemplary optical connector module according to a second embodiment of the present invention.
Figure 11:
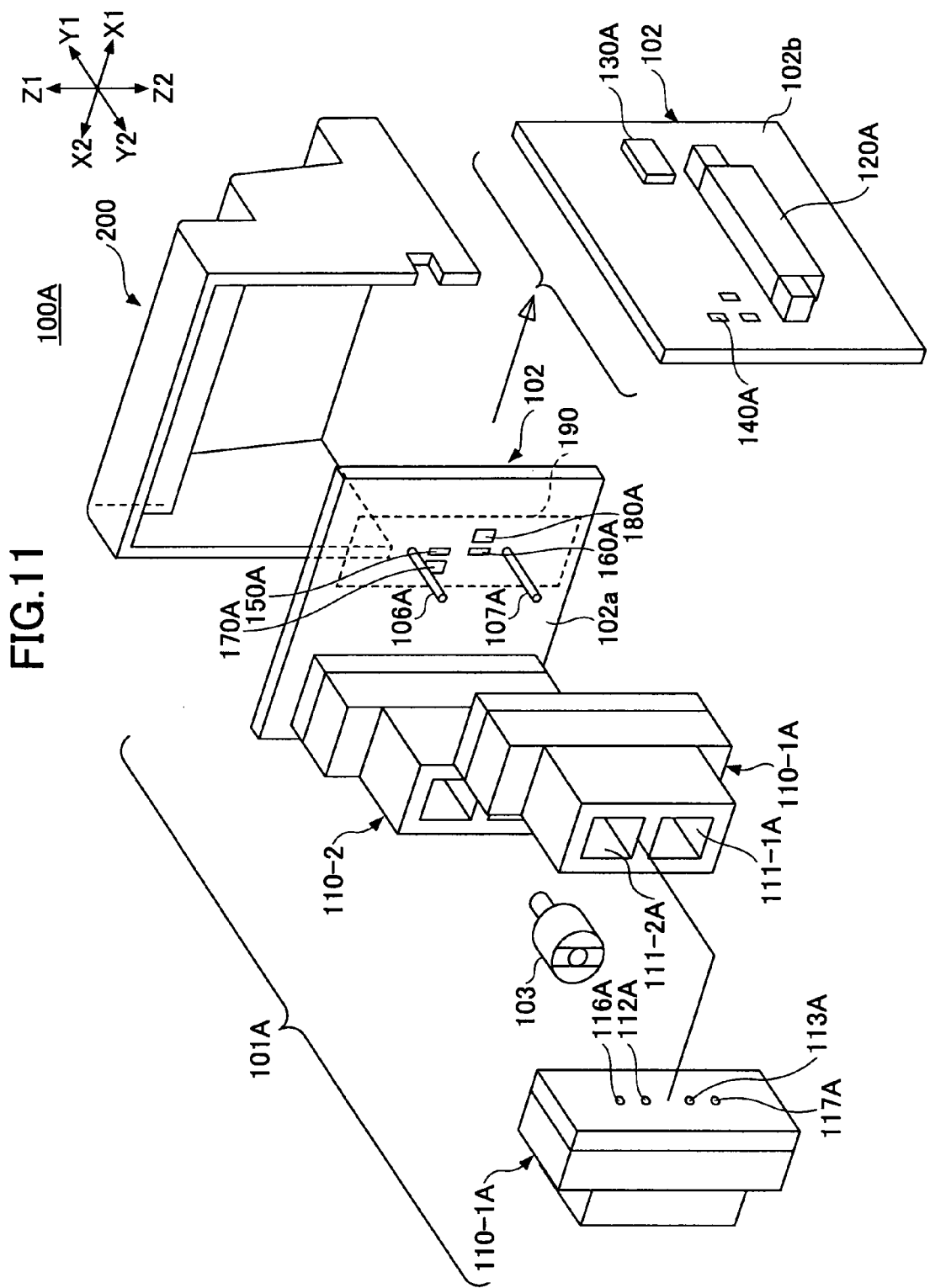
FIG. 11 is an exploded perspective view of the exemplary optical connector module shown in FIG. 10.

FIG. 10 is a perspective view of an optical connector module 100A according to a second embodiment of the present invention. FIG. 11 is an exploded perspective view of the optical connector module 100A.

The optical connector module 100A is used for serial transmission and includes SC-type optical connectors 110-1A and 110-2A instead of the MPO-type (or MTP-type) optical connectors 110-1 and 110-2 of the optical connector module 100.

Also, on the printed circuit board 102, a surface emitting diode 150A having one light-emitting part is mounted instead of the surface emitting diode 150 and a photodetector 160A having one light-receiving part is mounted instead of the photodetector 160.

The optical connectors 110-1A and 110-2A are mounted on the printed circuit board 102 with their positions determined by reference pins 106A and 107A. Lenses 112A and 113A are optically connected to the surface emitting diode 150A and the photodetector 160A, respectively. The optical connector 110-1A has two optical plug sockets 111-1A and 111-2A.

As in the case of the optical connector module 100, the optical connector module 100A can be mounted on the main board 210 in place of the electric connector module 220-1.

An optical fiber cable 280 is made up of an optical fiber 281 and an optical fiber 282. The optical fiber 281 has an SP-type optical plug 283 at one end and the optical fiber 282 has an SP-type optical plug 284 at one end.

The fiber cable 280 is connected to the optical connector 110-1A with the optical plug 283 fitted into the optical plug socket 111-1A and the optical plug 284 fitted into the optical plug socket 111-2A.

The configuration of the optical connector 100-2A is substantially the same as that of the optical connector 110-1A.

Third Embodiment

Figure 12:
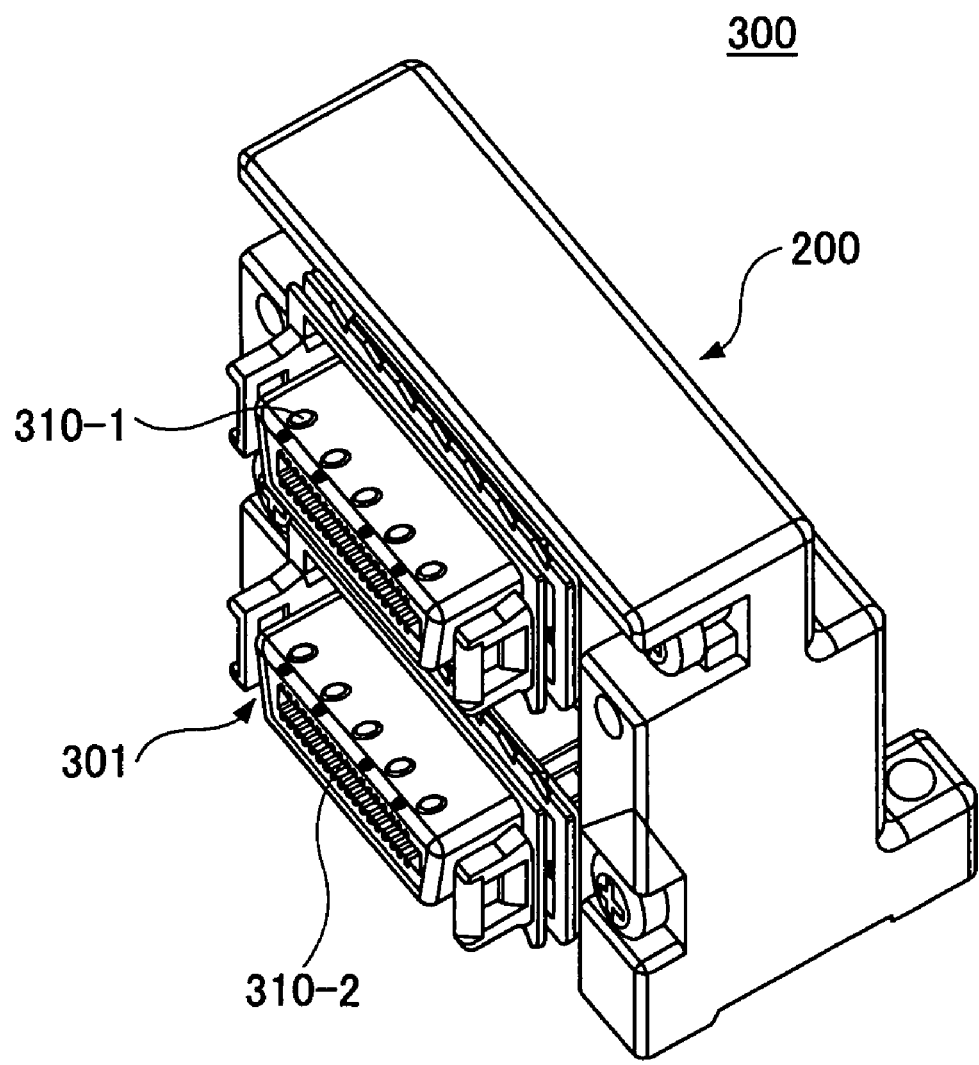
FIG. 12 is a perspective view of an exemplary electric connector module according to a third embodiment of the present invention.
Figure 13:
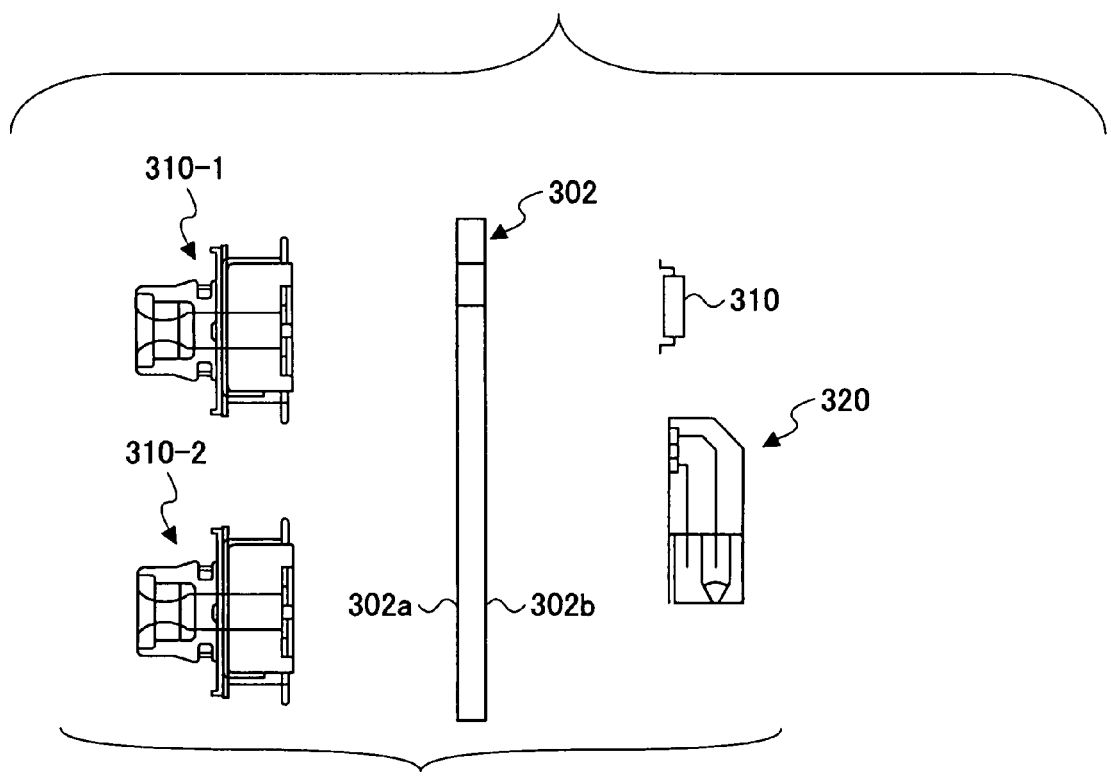
FIG. 13 is an exploded side view of the exemplary electric connector module shown in FIG. 12.
Figure 13:
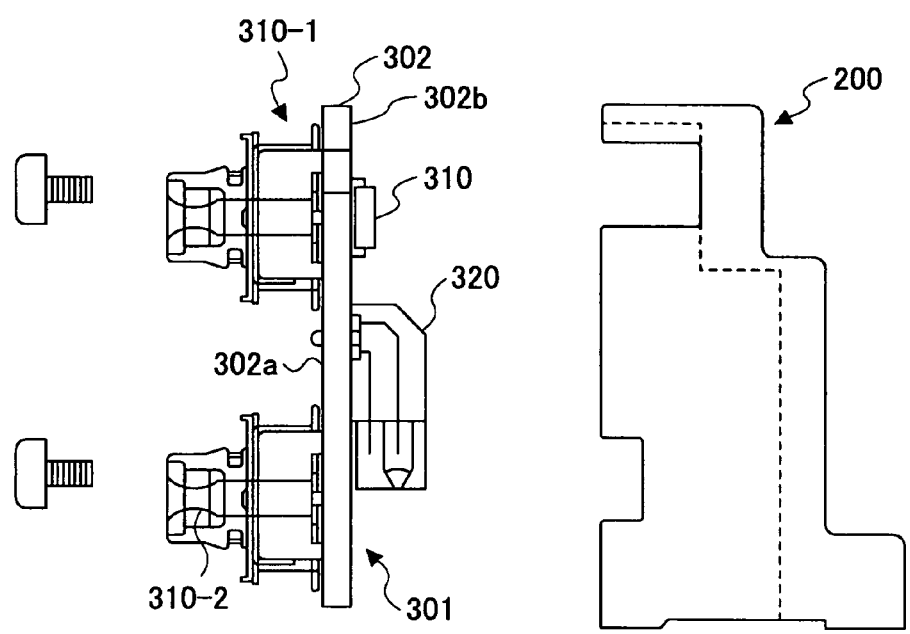

FIG. 12 is a perspective view of an electric connector module 300 according to a third embodiment of the present invention. FIG. 13 is an exploded perspective view of the electric connector module 300.

The electric connector module 300 includes a module main unit 301 and a holder 200 for holding the module main unit 301.

The module main unit 301 includes a printed circuit board 302, electric connectors 310-1 and 310-2 for balanced transmission which are arranged parallel to each other on a front side 302a of the printed circuit board 302, a module-side electric connector 320 mounted on a back side 302b of the printed circuit board 302, and a PHY-IC 310 mounted on the back side 302b of the printed circuit board 302. The PHY-IC 310 provides functions of, for example, an active equalizer, a passive equalizer, and a CDR.

As in the case of the optical connector module 100 or 100A, the electric connector module 300 can be mounted on the main board 210 in place of the electric connector module 220-1. When an electric signal is transmitted through an electric cable to the electric connector module 300, the PHY-IC 310 restores the waveform of the electric signal and sends the electric signal to the main board 210.

On the other hand, when an electric signal is transmitted from the server to an electric cable, the PHY-IC 310 restores the waveform of the electric signal and sends the electric signal with high quality to the electric cable.

Using the electric connector modules 300 at both ends of communication, in other words, at two communicating servers, makes it possible to increase the maximum length of an electric cable within which a signal can be transmitted correctly.

An optical connector module according to an embodiment of the present invention has substantially the same outside dimensions as those of an electric connector module and has functions to convert an electric signal into an optical signal and vice versa. Therefore, the signal transmission characteristics of a server can be improved by just replacing the electric connector module on the main board with the optical connector module without replacing the main board itself. In other words, an optical connector module according to an embodiment of the present invention makes it possible to reduce the economic burden on the user when improving the signal transmission characteristics of a server.

The present invention is not limited to the specifically disclosed embodiments, and variations and modifications may be made without departing from the scope of the present invention.

The present application is based on Japanese Priority Application No. 2006-193220 filed on Jul. 13, 2006 with the Japanese Patent Office, the entire contents of which are hereby incorporated herein by reference.

What is claimed is:

1. An optical connector module, comprising:
   a printed circuit board having a first surface and a second surface opposing the first surface, the first surface and the second surface being separated by a thickness of the printed circuit board;
   two or more optical connectors mounted on the first surface of the printed circuit board, each of the optical connectors being configured to receive an optical plug provided at an end of an optical fiber cable;
   photoelectric conversion units provided for the corresponding optical connectors and mounted on the first surface of the printed circuit board such that an optical axis of each of the photoelectric conversion units is perpendicular to the first surface of the printed circuit board, each of the photoelectric conversion units being configured to convert an optical signal into an electric signal and vice versa;
   a module-side electric connector mounted on the second surface of the printed circuit board and configured to be connected to a board-side electric connector on a main board; and
   a holder configured to hold the printed circuit board and to be fastened to a surface of the main board near an edge thereof such that the first and second surfaces of the printed circuit board are positioned perpendicular to a surface of the main board and the first surface and second surfaces of the printed circuit board become parallel to the edge of the main board;
   wherein the optical connector module has substantially the same outside dimensions as those of an electric connector module mountable on the main board which electric connector module includes electric connectors each configured to receive an electric plug provided at an end of an electric cable.

2. The optical connector module as claimed in claim 1, wherein each of the optical connectors is an MPO-type optical connector.

3. The optical connector module as claimed in claim 1, wherein each of the optical connectors is an SC-type optical connector.

4. An optical connector module, comprising:
   a module main unit including:
   a printed circuit board having a first surface and a second surface opposing the first surface, the first surface and the second surface being separated by a thickness of the printed circuit board,
   two or more optical connectors mounted on the first surface of the printed circuit board such that an optical axis of each of the photoelectric conversion units is perpendicular to the first surface of the printed circuit board, each of the optical connectors being configured to receive an optical plug provided at an end of an optical fiber cable,
   photoelectric conversion units provided for the corresponding optical connectors and mounted on the first surface of the printed circuit board, each of the photoelectric conversion units including:
   a light-emitting element optically connected to the corresponding one of the optical connectors, a light-receiving element optically connected to the corresponding one of the optical connectors,
a driver IC configured to drive the light-emitting element, and
a receiver IC configured to amplify a signal from the light-receiving element, and
a module-side electric connector mounted on the second surface of the printed circuit board and configured to be connected to a board-side electric connector on a main board, and
a holder configured to hold the module main unit and to be fastened to a surface of the main board near an edge thereof such that the first and second surfaces of the printed circuit board are positioned perpendicular to a surface of the main board and the first and second surfaces of the printed circuit board become parallel to the edge of the main board;
wherein the optical connector module has substantially the same outside dimensions as those of an electric connector module mountable on the main board which electric connector module includes electric connectors each configured to receive an electric plug provided at an end of an electric cable and a module-side electric connector to be connected to the board-side electric connector on the main board.

5. An electric connector module, comprising:
a module main unit including:
a printed circuit board having a first surface and a second surface opposing the first surface, the first surface and the second surface being separated by a thickness of the printed circuit board,
two or more electric connectors mounted on the first surface of the printed circuit board, each of the electric connectors being configured to receive an electric plug provided at an end of an electric cable,
a module-side electric connector mounted on the second surface of the printed circuit board and configured to be connected to a board-side electric connector on a main board, and
a PHY-IC mounted on the back side of the printed circuit board and configured to restore a waveform of an electric signal; and
a holder configured to hold the module main unit and to be fastened to a surface of the main board near an edge thereof such that the first and second surfaces of the printed circuit board are positioned perpendicular to a surface of the main board and the first and second surfaces of the printed circuit board become parallel to the edge of the main board;
wherein the electric connector module has substantially the same outside dimensions as those of an optical connector module mountable on the main board which optical connector module includes optical connectors each configured to receive an optical plug provided at an end of an optical fiber cable and a module-side electric connector to be connected to the board-side electric connector on the main board.

6. An optical connector module, comprising:
a printed circuit board having a first surface and a second surface opposing the first surface, the first surface and the second surface being separated by a thickness of the printed circuit board;
two or more optical connectors mounted on the first of the printed circuit board, each of the optical connectors being configured to receive an optical plug provided at an end of an optical fiber cable;
photoelectric conversion units provided for the corresponding optical connectors and mounted on the first surface of the printed circuit board such that an optical axis of each of the photoelectric conversion units is perpendicular to the first surface of the printed circuit board;
a module-side electric connector mounted on the second surface of the printed circuit board and configured to be connected to a board side electric connector on a main board;
a holder configured to hold the printed circuit board and to be fastened to a surface of the main board near an edge thereof such that the first and second surfaces of the printed circuit board are positioned perpendicular to a surface of the main board and the first and second surfaces of the printed circuit board become parallel to the edge of the main board; and
an electric connector module mountable on the main board which include electric connectors configured to receive an electric plug provided at an end of an electric cable.

7. An optical connector module, comprising:
a printed circuit board having a first and a second surface opposing the first surface, the first surface and the second surface being separated by a thickness of the printed circuit board;
a main board;
a plurality of optical connectors mounted on the first surface of the printed circuit board;
photoelectric conversion units mounted on the first surface of the printed circuit board such that an optical axis of each of the photoelectric conversion units is perpendicular to the first surface of the printed circuit board;
a module-side electric connector mounted on the second surface of the printed circuit board;
a holder holding the printed circuit board and fastened to the surface of the main board such that the first and second surfaces of the printed circuit board are positioned perpendicular to a surface of the main board and the first and second surfaces of the printed circuit board become parallel to an edge of the main board.

* * * * *

UNITED STATES PATENT AND TRADEMARK OFFICE
CERTIFICATE OF CORRECTION

| | |
|---|---|
| PATENT NO. | : 7,581,892 B2 |
| APPLICATION NO. | : 11/730692 |
| DATED | : September 1, 2009 |
| INVENTOR(S) | : Osamu Daikuhara |

It is certified that error appears in the above-identified patent and that said Letters Patent is hereby corrected as shown below:

Column 10, Line 9, change "first of" to --first surface of--.

Column 10, Line 21, change "board side" to --board-side--.

Column 10, Line 31, change "include" to --includes--.

Column 10, Line 34, change "first and" to --first surface and--.

Column 10, Line 48, change "the surface" to --a surface--.

Signed and Sealed this

Fifth Day of January, 2010

David J. Kappos
*Director of the United States Patent and Trademark Office*